United States Patent
Mohany (10) Patent No.: US 10,286,754 B2
(45) Date of Patent: May 14, 2019

(54) PRESSURE RELIEF VALVE FOR AUTOMOBILE

(71) Applicant: WEGU MANUFACTURING INC., Whitby (CA)

(72) Inventor: Atef Mohany, Oshawa (CA)

(73) Assignee: WEGU MANUFACTURING INC., Whitby, Ontario (CA)

( * ) Notice: Subject to any disclaimer, the term of this patent is extended or adjusted under 35 U.S.C. 154(b) by 143 days.

(21) Appl. No.: 15/083,930

(22) Filed: Mar. 29, 2016

(65) Prior Publication Data

US 2017/0282688 A1 Oct. 5, 2017

(51) Int. Cl.
*B60H 1/24* (2006.01)
(52) U.S. Cl.
CPC .................... *B60H 1/249* (2013.01)
(58) Field of Classification Search
CPC ........................................ B60H 1/249
USPC ......................................... 454/162
See application file for complete search history.

(56) References Cited

U.S. PATENT DOCUMENTS

| 2,224,312 | A | * | 12/1940 | O'Day | F24F 13/06 454/320 |
| 5,419,739 | A | * | 5/1995 | Lewis | B60H 1/249 137/855 |
| 6,210,266 | B1 | | 4/2001 | Barton | |
| 2009/0280736 | A1 | * | 11/2009 | Schneider | B60H 1/249 454/162 |
| 2010/0311317 | A1 | * | 12/2010 | McReynolds | G05D 23/2716 454/256 |
| 2013/0072101 | A1 | | 3/2013 | Marleau, Jr. et al. | |

FOREIGN PATENT DOCUMENTS

WO 2012021366 2/2012

* cited by examiner

*Primary Examiner* — Steven B McAllister
*Assistant Examiner* — Allen R Schult
(74) *Attorney, Agent, or Firm* — Ware, Fressola, Maguire & Barber LLP

(57) ABSTRACT

A pressure relief valve for an automobile, the valve comprising a frame having a top portion, a bottom portion, a left side portion and a right side portion surrounding a central air passage, the frame having an inlet side for receiving air from a passenger compartment of the automobile and having an outlet side for exhausting the air from the passenger compartment of the automobile. The valve includes a plurality of horizontal members extending between the left side portion and the right side portion, a plurality of delta-shaped spoilers supported by the horizontal members and a plurality of flaps pivotally mounted on the outlet side to pivot between a closed position that inhibits airflow and an open position that permits airflow.

15 Claims, 8 Drawing Sheets

PRESSURE RELIEF VALVE FOR AUTOMOBILE

TECHNICAL FIELD

The present disclosure relates generally to pressure-relief valves and, more particularly, to pressure relief valves for use in relieving overpressure in a passenger compartment of an automobile.

BACKGROUND

An interior passenger compartment of an automobile is designed to provide a quiet environment and to protect the driver and passengers from outside elements, such as rain, snow, cold, heat, dust, exhaust fumes, pollution, etc. As such, automobiles typically provide an interior passenger compartment that is substantially sealed from the surrounding exterior environment. However, the air pressure inside the interior passenger compartment may undesirably exceed atmospheric pressure in some instances, for example, when a vehicle door is closed. If the interior is not vented to the atmosphere, the effort required to close the door may greatly increase, inconveniencing the driver or passenger of the vehicle. Deployment of air bags may also cause a sudden increase in internal pressure. Higher internal pressures can also be created by a fan of a climate control system or by the inrush of outside air when a window or sunroof is opened when traveling at high speeds.

Pressure relief valves for equalizing the pressure between the interior compartment of an automobile and the atmosphere are known. The pressure relief valve is placed between the interior space and the outside of the vehicle in order to control an exhaust flow of air from the interior. The pressure relief valve (or "air extractor") is typically connected by a duct to the passenger compartment. The valve permits air to be expelled or discharged from the vehicle passenger compartment, while preventing air, gas, fumes, and/or other undesirable substances from entering into the passenger compartment. By minimizing overpressure in the passenger compartment, the pressure relief valve improves the performance of the climate control system, makes it easier to close doors, and reduces the unpleasant buffeting noise from open windows. Further performance improvements, particularly to improve flow characteristics through the valve, would be highly desirable. Accordingly, a pressure relief valve with improved aero-acoustic properties would be useful to reduce noise in the passenger compartment.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a pressure relief valve with improved aero-acoustic properties. The pressure relief valve uses delta-shaped spoilers to improve airflow characteristics through the valve, thereby reducing flutter of the flaps and thus reducing the overall noise generated by the airflow.

One inventive aspect of the disclosure is a pressure relief valve for an automobile, the valve comprising a frame having a top portion, a bottom portion, a left side portion and a right side portion surrounding a central air passage, the frame having an inlet side for receiving air from a passenger compartment of the automobile and having an outlet side for exhausting the air from the passenger compartment of the automobile. The valve includes a plurality of horizontal members extending between the left side portion and the right side portion, a plurality of delta-shaped spoilers supported by the horizontal members and a plurality of flaps pivotally mounted on the outlet side to pivot between a closed position that inhibits airflow and an open position that permits airflow.

Another inventive aspect of the disclosure is an automobile comprising a passenger compartment defining an interior space and a pressure relief valve including a frame having a top portion, a bottom portion, a left side portion and a right side portion surrounding a central air passage, the frame having an inlet side for receiving air from the passenger compartment and an outlet side for exhausting the air from the passenger compartment. The valve further includes a plurality of horizontal members extending between the left side portion and the right side portion, a plurality of delta-shaped spoilers supported by the horizontal members and a plurality of flaps pivotally mounted on the outlet side to pivot between a closed position that inhibits airflow and an open position that permits airflow.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

Described herein are various embodiments of a pressure relief valve for an automobile. The pressure relief valve has delta-shaped spoilers to improve airflow characteristics through the valve, thereby reducing flutter of the flaps and the overall noise generated by the airflow. For the purposes of this specification, the term "automobile" shall be construed broadly to encompass any automotive vehicle including, for greater certainty, any trucks, buses, vans, minivans, sports utility vehicles (SUV's) or any other vehicle that has an enclosed passenger compartment for which an overpressure condition may be relieved using a pressure relief valve.

Figure 1:
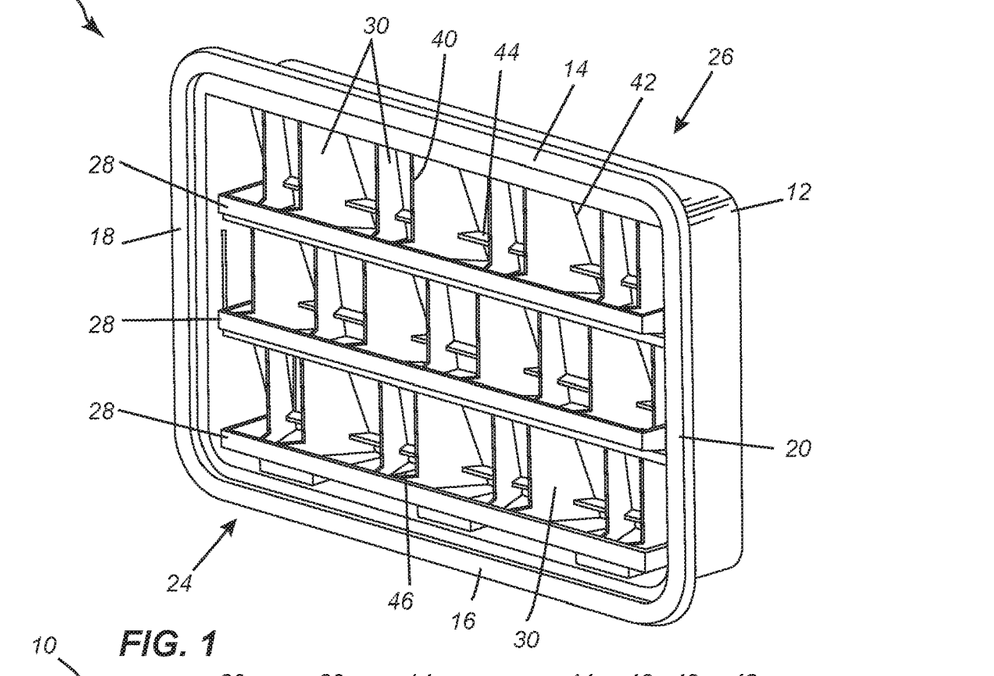
FIG. 1 is an isometric view of a pressure relief valve in accordance with a first embodiment of the present invention, shown from the inlet side.
Figure 2:
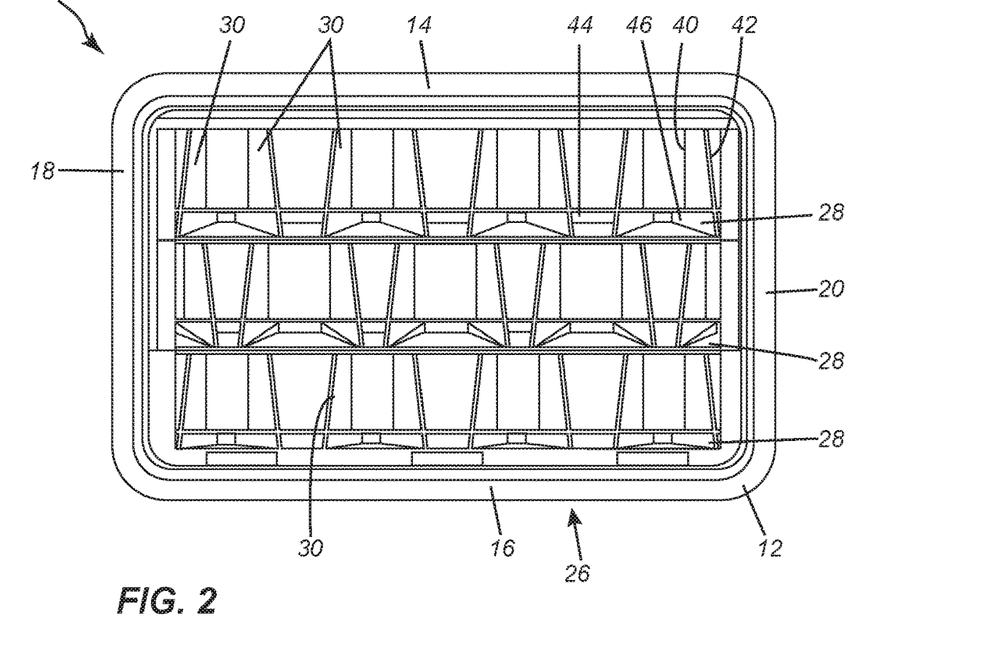
FIG. 2 is a rear view of the pressure relief valve of FIG. 1, shown from the outlet side.
Figure 3:
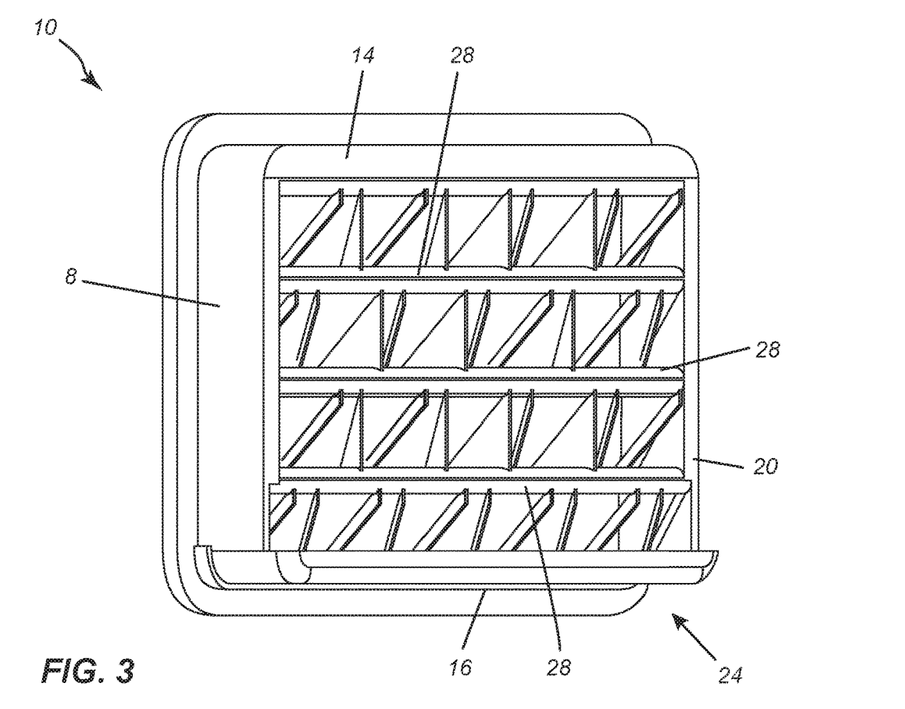
FIG. 3 is an isometric view of a pressure relief valve in accordance with a second embodiment of the present invention, shown from the inlet side.
Figure 4:
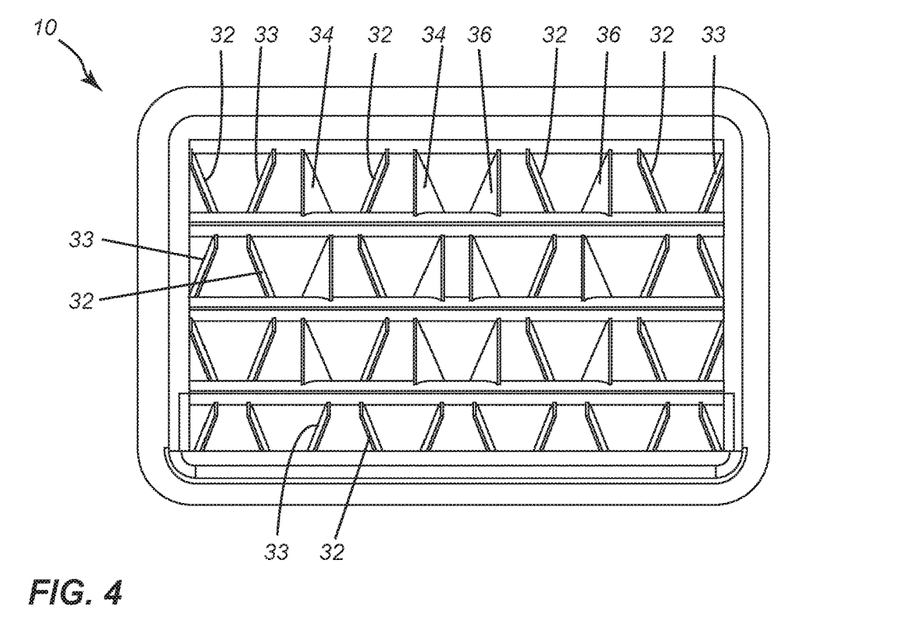
FIG. 4 is a front view of the pressure relief valve of FIG. 3.

In the embodiment depicted by way of example in FIGS. 1 and 2, a pressure relief valve, which is generally designated by reference numeral 10, is designed to be installed in an automobile for the purpose of relieving overpressure in the passenger compartment of the automobile. The valve 10 has a housing or frame 12 and a mounting seal having a top portion 14, a bottom portion 16, a left side portion 18 and a right side portion 20 surrounding a central air passage 22. The top, bottom, left side and right side portions are joined at rounded corners to define a perimeter-like mounting seal which is attached to, or integrally formed, with the frame for supporting spoilers as will be explained below. The top and bottom portions are longer than the left and right portions so that the frame has a generally rectangular shape (except for the curved corners). In the illustrated embodiments, the framemounting seal is shaped like a flange-like lip to permit mounting of the valve in a flat portion of an internal wall, vehicle body panel or other internal vehicle structure. The frame has an inlet side 24 for receiving air from a passenger compartment of the automobile and an outlet side 26 for exhausting the air from the passenger compartment of the automobile. In the embodiment depicted by way of example in FIGS. 1 and 2, the valve has a plurality of horizontal members that act as flap supports 28 extending between the left side portion and the right side portion. The valve includes a plurality of delta-shaped spoilers 30 supported by the horizontal members. The spoilers generate aerodynamic drag on the airflow to streamline the airflow and to reduce unwanted noise. The valve further includes a plurality of flaps (not shown in FIGS. 1 and 2) which are pivotally mounted on the outlet side to pivot between a closed position that inhibits airflow and an open position that permits airflow. The flaps permit only one-way flow for the air, i.e. the flaps permits air to exhaust from the passenger compartment without allowing outdoor air to flow back into the passenger compartment. The flaps may be a plurality of generally horizontal, equally dimensioned slats that are each pivotally connected or hinged to the frame and/or to the horizontal members. In one embodiment, there is one flap for each row of spoilers. In this embodiment, each flap is dimensioned to cover one row of spoilers. In this embodiment, each flap is hinged or pivotally connected to a respective horizontal member.

In the embodiment illustrated in FIGS. 1 and 2, there are two equally spaced horizontal members acting as flap supports 28 that are also spaced apart from the top portion 14 and the bottom portion 16 of the frame. The spacing between horizontal members acting as flap supports 28 may be varied in other embodiments. The valve 10 may include further horizontal members in the form of a third (bottom) horizontal member disposed along the top side of the bottom portion and a fourth (top) horizontal member disposed along the underside of the top portion. These third and fourth horizontal members provide mounting points for the bottom and top rows of spoilers. Alternatively, the bottom and top rows of spoilers may be mounted directly to the top side of the bottom portion and to the underside of the top portion. In the latter case, the third and fourth horizontal members may be eliminated.

In the embodiment illustrated in FIGS. 1 and 2, the delta-shaped spoilers 30 are quadrilateral although variations on this shape may be possible. In this particular embodiment, the delta-shaped spoilers are grouped in symmetrical pairs in first, second and third rows separated by the two horizontal members. The spoilers in the first (bottom) and third (top) row diverge in an airflow direction whereas the spoilers in the second (middle) row converge in the airflow direction. The spoilers in FIGS. 1 and 2 are grouped in four symmetrical pairs in the first, second and third rows. In the embodiment illustrated in FIGS. 1 and 2, the delta-shaped spoilers have a trailing edge 40 (downstream spoiler edge) that may be vertical or slightly inclined and an upwardly sloped leading edge 42 (upstream spoiler edge) which may have a constant upward slope as shown in the figures. Thin traverse members acting as spoiler supports 44 extend horizontally from the left side to the right side in this embodiment. As shown, there is one transverse member (spoiler support) 44 per row of spoilers. The transverse member (spoiler support) 44 divides each spoiler into a lower spoiler portion and an upper spoiler portion. The trailing edge 40 has a downwardly sloped rear element 46 that is within the lower spoiler portion.

In the embodiment illustrated in FIGS. 3-6, there are three equally spaced horizontal members acting as flap supports 28 that are also spaced apart from the top and bottom portions 14, 16 of the frame. As noted above, the spacing may be varied in other embodiments. In this embodiment, the delta-shaped spoilers are triangular (or a mix of triangular and quadrilateral) although variations on the illustrated shapes may be possible. In this embodiment, the delta-shaped spoilers are disposed in first, second, third and fourth rows separated by the three horizontal members. In this particular embodiment, the spoilers in the first (bottom) row are grouped as symmetrical pairs whereas the spoilers in the second, third and fourth rows are grouped in alternating symmetrical and asymmetrical pairs. The spoilers in the first row are grouped as five symmetrical pairs. The spoilers in the second, third and fourth rows are grouped in five alternating symmetrical and asymmetrical pairs. In the embodiment illustrated in FIGS. 3-6, The first (bottom) row is composed of left-inclined quadrilateral spoilers 32 paired with right-inclined quadrilateral spoilers 33. The fourth (top) row has (from left to right in FIG. 4) a left-inclined quadrilateral spoiler 32, a right-inclined quadrilateral spoiler 33, a right-sloping triangular spoiler 34, another right-inclined quadrilateral spoiler 33, another right-sloping triangular spoiler 34, a left-sloping triangular spoiler 36, another left-inclined quadrilateral spoiler 32, another right-sloping triangular spoiler 36, another left-inclined quadrilateral spoiler 32, and another right-inclined quadrilateral spoiler 33. The second row (second from the bottom) is identical to the fourth (top) row in this embodiment. The third row (third from the bottom) has (from left to right in FIG. 4) a right-inclined quadrilateral spoiler 33, a left-inclined quadrilateral spoiler 32, a left-sloping triangular spoiler 36, another left-inclined quadrilateral spoiler 32, another left-sloping triangular spoiler 36, a right-sloping triangular spoiler 34, another right-inclined quadrilateral spoiler 33, another right-sloping triangular spoiler 34, another right-inclined quadrilateral spoiler 33, and another left-inclined quadrilateral spoiler 32. "Inclined" in this above context refers to the verticality of the trailing edge whereas "sloped" refers to the angle of the leading edge.

Figure 5:
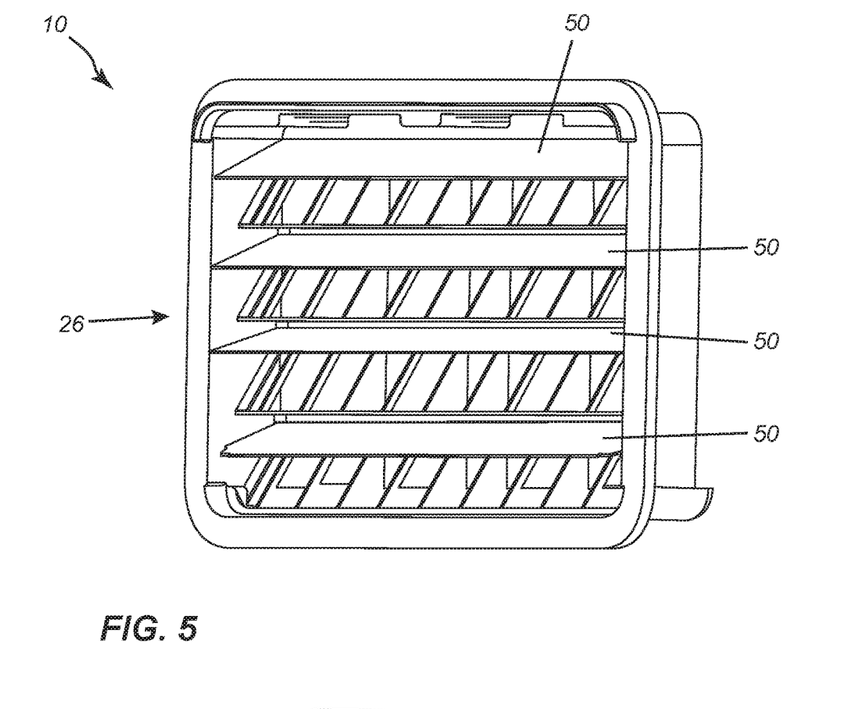
FIG. 5 is a rear isometric view of the pressure relief valve of FIG. 3.
Figure 6:
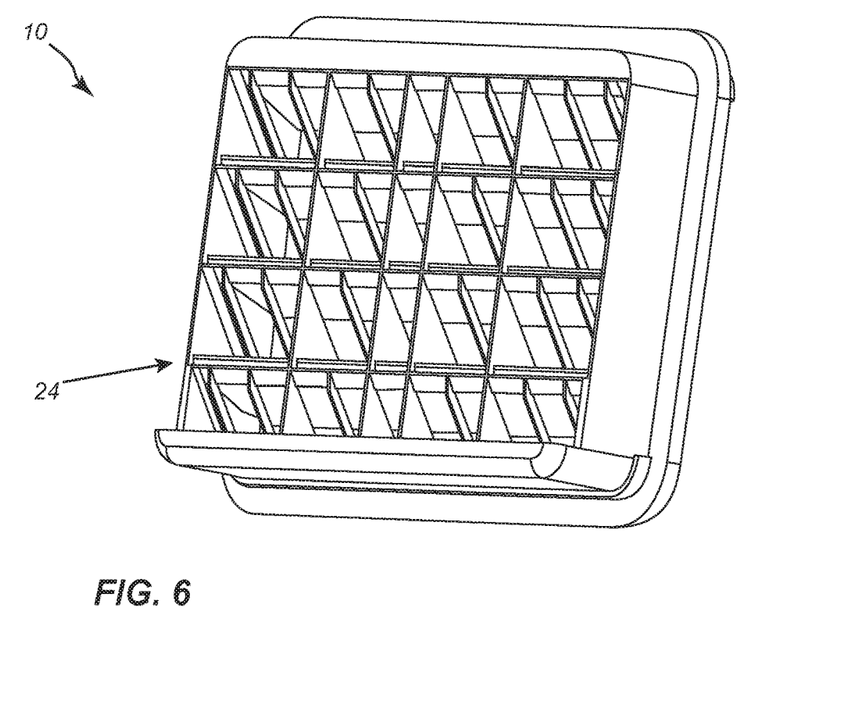
FIG. 6 is an isometric view of the pressure relief valve of FIG. 3.

As further illustrated in FIG. 5, the pressure relief valve 10 has a plurality of flaps (or slats) 50. In this illustrated embodiment, there are four flaps 50, i.e. one flap per row of spoilers. These are pivoted connected (hinged or otherwise rotationally mounted) to pivot between a closed position that obstructs airflow and an open position that permits airflow. The flaps are disposed on the outlet side. When the pressure equilibrates, the flaps return naturally to their closed position, e.g. under the force of gravity. In another embodiment, the flaps may be connected to springs or other resilient members that mechanically bias the flaps to their closed position. FIG. 6 shows the inlet side of the valve of FIG. 5.

Figure 7:
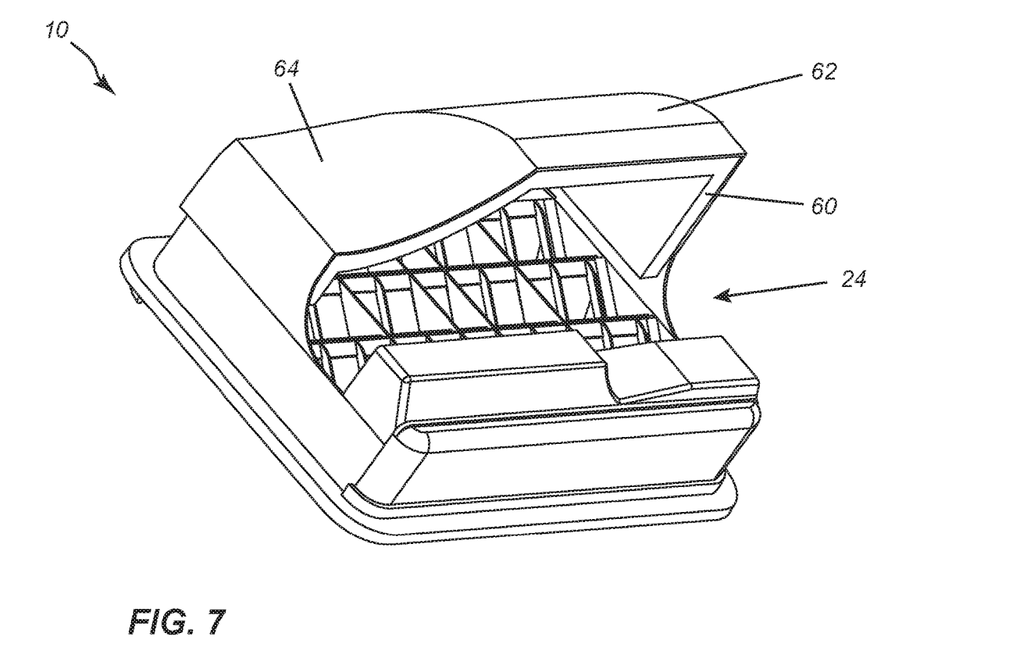
FIG. 7 is an isometric view of a variant of the pressure relief valve of FIG. 3 in which the pressure relief valve has a cap partially enshrouding an inlet face.
Figure 8:
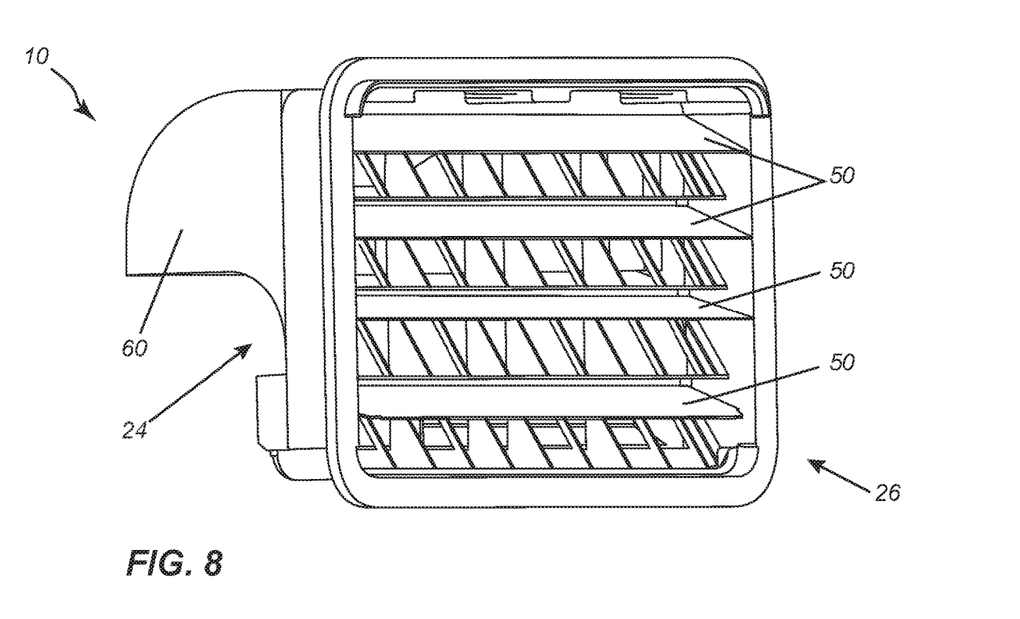
FIG. 8 is an isometric view of the variant of FIG. 7 shown from the outlet side.
Figure 9:
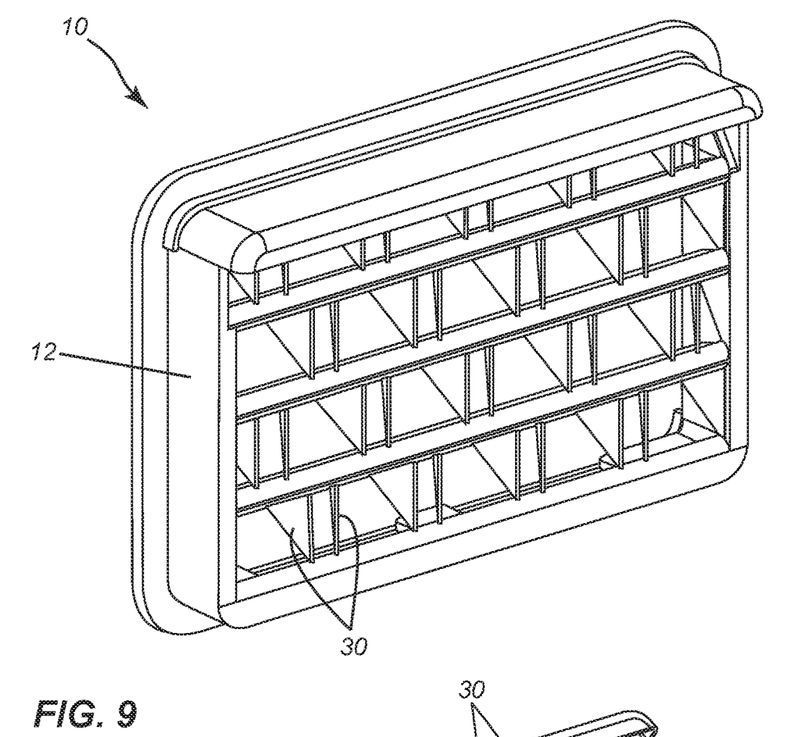
FIGS. 9-15 are isometric views of a third embodiment of a pressure relief valve shown from different perspectives.
Figure 10:
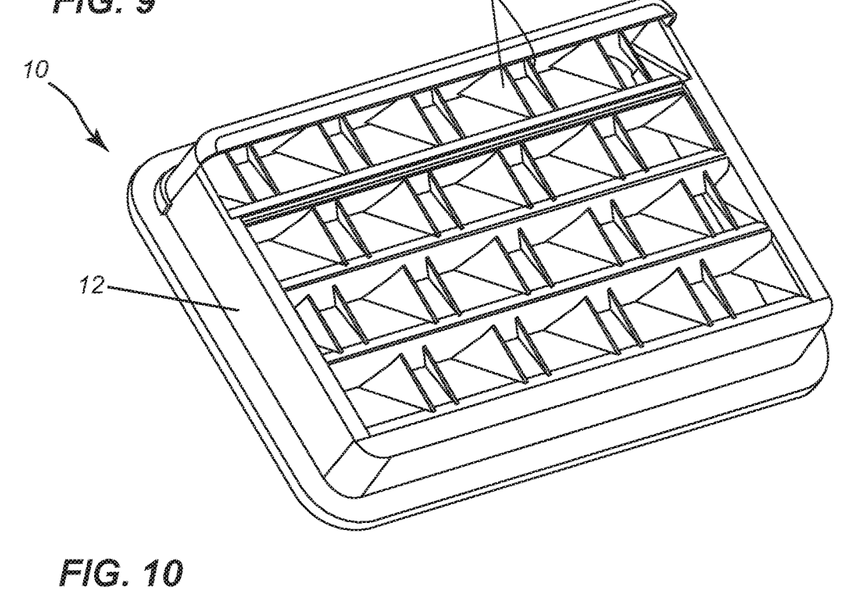
Figure 11:
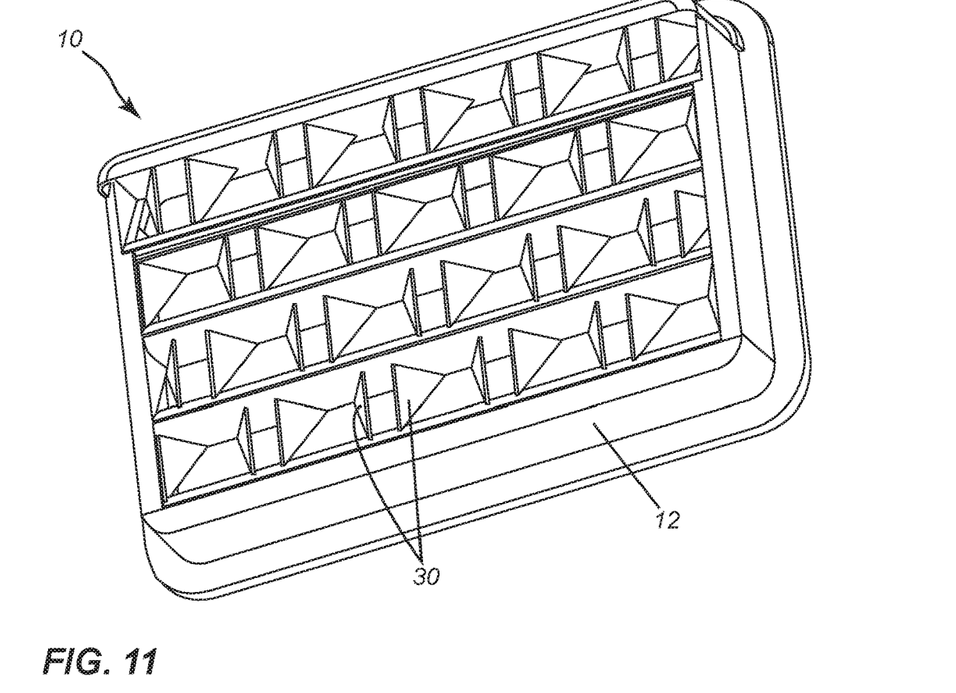
Figure 12:
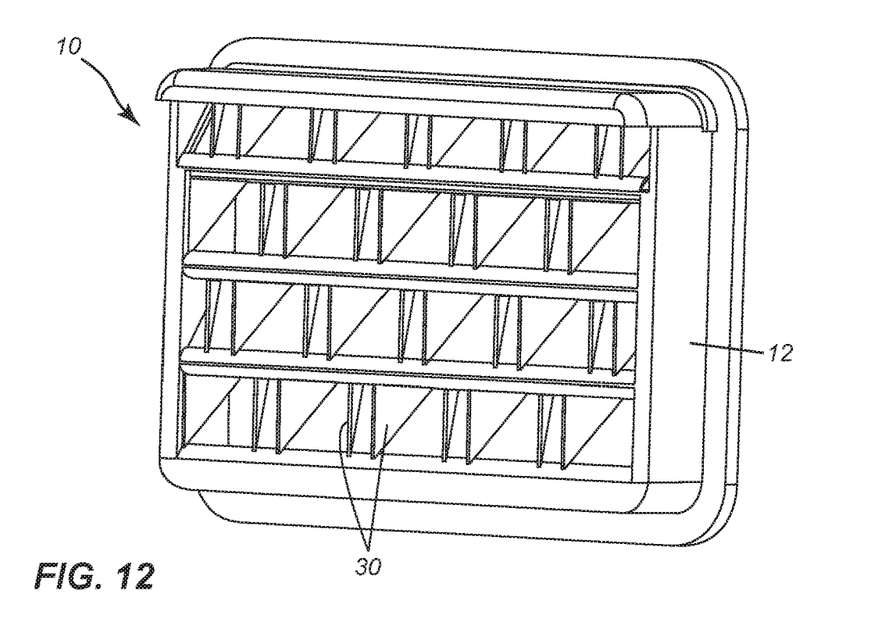
Figure 13:
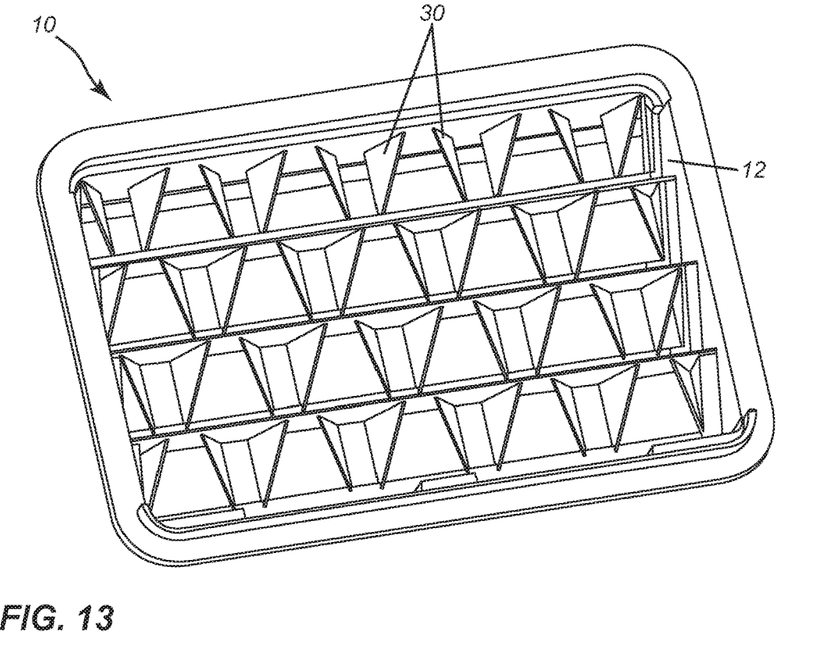
Figure 14:
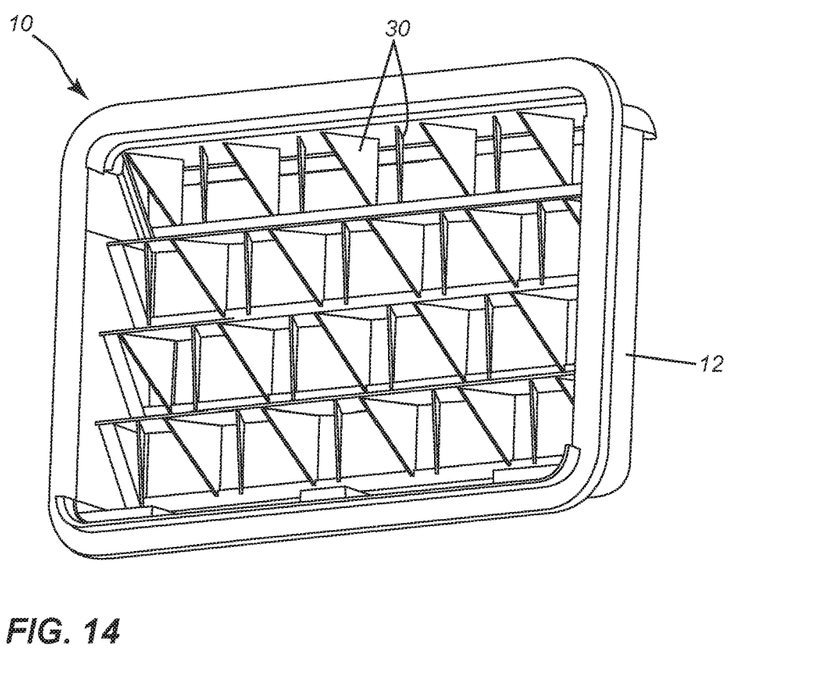
Figure 15:
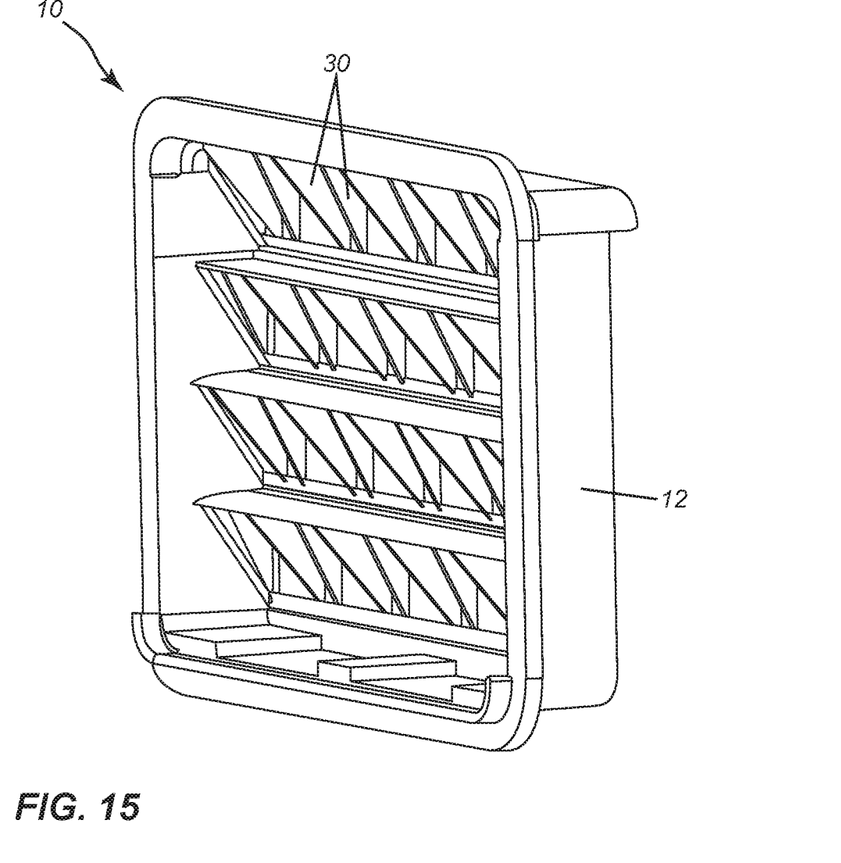

A variant of the embodiment of FIGS. 3-6 is illustrated in FIGS. 7 and 8, which show the pressure relief valve 10 having a cap 60 mounted on the inlet side. The cap 60 comprises a rounded shroud 62 (or hood) for partially enshrouding the inlet side 24 of the valve 10. The cap has a concave portion 64 as shown by way of example in FIG. 7.

In the embodiment illustrated in FIGS. 7 and 8, the concave portion 64 is curved about an axis that is orthogonal to an axis of curvature of the rounded shroud. In this embodiment, the axes are both orthogonal to an airflow direction. The concave portion 64 may have a constant radius of curvature or a varying radius of curvature. Likewise, the shroud 62 may have a constant radius of curvature or a varying radius of curvature.

FIGS. 9-15 are isometric views of a third embodiment of the pressure relief valve shown from different perspectives. In the embodiment shown in FIGS. 9-15, there are four rows of delta-shaped spoilers 30 arranged in symmetrical pairs.

The valve 10 may be made of a suitable polymer or any other material that is structurally and functionally equivalent, e.g. composite materials, metals, or alloys or any combination of suitable materials. Individual plastic components or parts of the valve may be made using known fabrication techniques such as plastic molding, extrusion, etc.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A pressure relief valve for an automobile, the valve comprising:
   a frame having a top portion, a bottom portion, a left side portion and a right side portion surrounding a central air passage, the frame having an inlet side for receiving air from a passenger compartment of the automobile and having an outlet side for exhausting the air from the passenger compartment of the automobile;
   a plurality of horizontal members extending between the left side portion and the right side portion;
   a plurality of delta-shaped spoilers supported by the horizontal members, wherein the delta-shaped spoilers are grouped in symmetrical pairs in first, second and third rows separated by each of the horizontal members and wherein the spoilers in the first and third row diverge in an airflow direction and wherein the spoilers in the second row converge in the airflow direction; and
   a plurality of flaps pivotally mounted on the outlet side to pivot between a closed position that inhibits airflow and an open position that permits airflow wherein the plurality of flaps rest on the delta-shaped spoilers in the closed position.

2. The valve of claim 1 wherein the plurality of horizontal members comprises two equally spaced horizontal members.

3. The valve of claim 1 wherein the delta-shaped spoilers are triangular.

4. The valve of claim 1 wherein the delta-shaped spoilers are quadrilateral.

5. The valve of claim 2 wherein the delta-shaped spoilers are quadrilateral.

6. The valve of claim 5 wherein the spoilers are grouped in four symmetrical pairs in the first, second and third rows.

7. The valve of claim 1 further comprising a cap mounted on the inlet side, wherein the cap comprises a rounded shroud for partially enshrouding the inlet side of the valve.

8. The valve of claim 7 wherein the cap comprises a concave portion curved about an axis that is orthogonal to an axis of curvature of the rounded shroud, wherein the axes are both orthogonal to an airflow direction.

9. An automobile comprising:
   a passenger compartment defining an interior space;
   a pressure relief valve including:
   a frame having a top portion, a bottom portion, a left side portion and a right side portion surrounding a central air passage, the frame having an inlet side for receiving air from the passenger compartment and an outlet side for exhausting the air from the passenger compartment;
   a plurality of horizontal members extending between the left side portion and the right side portion;

a plurality of delta-shaped spoilers supported by the horizontal members, wherein the delta-shaped spoilers are grouped in symmetrical pairs in first, second and third rows separated by each of the horizontal members and wherein the spoilers in the first and third row diverge in an airflow direction and wherein the spoilers in the second row converge in the airflow direction; and a plurality of flaps pivotally mounted on the outlet side to pivot between a closed position that inhibits airflow and an open position that permits airflow wherein the plurality of flaps rest on the delta-shaped spoilers in the closed position.

10. The automobile of claim 9 wherein the plurality of horizontal members comprises two equally spaced horizontal members.

11. The automobile of claim 9 wherein the delta-shaped spoilers are triangular.

12. The automobile of claim 9 wherein the delta-shaped spoilers are quadrilateral.

13. The automobile of claim 10 wherein the delta-shaped spoilers are quadrilateral.

14. The automobile of claim 9 wherein the valve further comprises a cap mounted on the inlet side, wherein the cap comprises a rounded shroud for partially enshrouding the inlet side of the valve.

15. The automobile of claim 14 wherein the cap comprises a concave portion curved about an axis that is orthogonal to an axis of curvature of the rounded shroud, wherein the axes are both orthogonal to an airflow direction.

\* \* \* \* \*